3,098,841
POLYNUCLEAR POLYAMINES
Rupert C. Morris, Berkeley, and Karl J. Sax, Orinda, Calif., assignors to Shell Oil Company, New York, N.Y., a corporation of Delaware
No Drawing. Filed July 11, 1960, Ser. No. 41,741
9 Claims. (Cl. 260—45.9)

This invention relates to novel polynuclear amines and, more particularly, to novel polyphenolic polyamines.

Polyamines, and aromatic diamines in particular, are well known as stabilizers for such materials as rubber, oils and greases and similar organic oxidizable compositions. In general, the conventional diamines, such as the N,N'-dialkyl-p-phenylenediamines, suffer from the defect that in rubber they are both staining and discoloring. A new class of polynuclear amines has now been found which provides superior stability to rubber without adding discoloring or staining properties thereto.

It is an object of this invention to provide new polynuclear polyamines. Another object is the provision of a process for preparing such polynuclear polyamines. Still another object is the provision of stabilized compositions containing such polynuclear amines. In particular, it is an object of the invention to provide stabilized non-staining and non-discoloring synthetic elastomeric compositions containing the polynuclear diamines. Other objects will be apparent from the following description of the invention.

These objects are accomplished by novel poly(3,5-dialkyl-4-hydroxybenzyl)diamines which comprise an organic diamine having at least one (3,5-dialkyl-4-hydroxybenzyl) radical attached to each nitrogen atom. In general, these polyamines have the structure

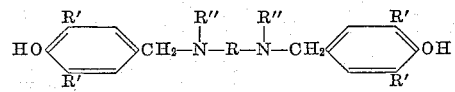

wherein R is a divalent hydrocarbon radical, preferably selected from alkylene and aromatic radicals having up to 12 carbon atoms, each R' is an alkyl group, preferably having up to 8 carbon atoms, and R" is a monovalent radical selected from the group consisting of the hydrogen atom, alkyl radicals, preferably having up to 8 carbon atoms, and the 3,5-dialkyl-4-hydroxybenzyl radicals pictured above. In the most advantageous embodiment of the invention, at least one of the alkyl radicals R' on each benzyl nucleus is branched on the alpha carbon atom.

It will be seen from this description that the novel polynuclear diamines of the invention are selected from secondary and tertiary diamines and may have from two to four of the hydroxybenzyl radicals. It is this multiplicity of the hydroxybenzyl radicals that lends the diamines their superior stabilizing properties.

Preferred diamines are the N,N,N',N'-tetra(3,5-dialkyl-4-hydroxybenzyl)diamines wherein the diamine nucleus depicted above by the divalent radical R is either alkylene or mononuclear aromatic. These compounds have the structure

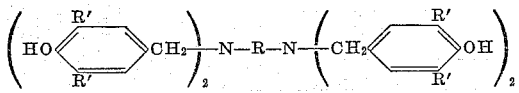

where R' and R have the above significance. Examples of such diamines include N,N,N',N'-tetra(3,5-diisopropyl-4 - hydroxybenzyl)ethylene diamine; N,N,N',N' - tetra (3 - isopropyl - 5 - ethyl - 4 - hydroxybenzyl)propane diamine; N,N,N',N' - tetra(3 - tert - butyl - 5 - isopropyl-4 - hydroxybenzyl)pentane diamine; N,N,N',N' - tetra (3,5 - di - tert - amyl - 4 - hydroxybenzyl)hexane diamine; N,N,N',N' - tetra(3 - tert - amyl - 5 - hexyl - 4-hydroxybenzyl)nonane diamine; and the like. Typical compounds where the diamine radical is aromatic include N,N,N',N' - tetra(3,5 - di - tert - butyl - 4 - hydroxybenzyl)phenylene diamine; N,N,N',N' - tetra(3,5 - di-isopropyl-4-hydroxybenzyl)durene diamine; N,N,N',N'-tetra(3 - isopropyl - 5 - sec - butyl - 4 - hydroxybenzyl) isodurene diamine; and the like. Compounds wherein the four hydroxybenzyl radicals are not identical, such as N,N - di(3,5 - di - tert - butyl - 4 - hydroxybenzyl)-N',N' - di(3,5 - diisopropyl - 4 - hydroxybenzyl) - p-phenylene diamine, and N,N-di(3,5-di-tert-amyl-4-hydroxybenzyl) - N',N' - di(3 - tert - butyl - 5 -methyl - 4-hydroxybenzyl)butane diamine are also useful antioxidants.

While the nitrogen atoms may be in any position on the alkylene or aromatic nucleus R, it has been found that the best antioxidants are those wherein the two nitrogen atoms are on the terminal carbon atom of the alkylene radical and in the para ring carbon atoms of aromatic nuclei.

The N,N'-di(3,5-dialkyl-4-hydroxybenzyl)diamines are also useful antioxidants. These compounds have the general structure

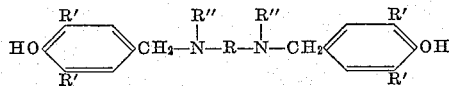

wherein each R and R' have the above significance and R" is either the hydrogen atom or an alkyl group, preferably having up to 8 carbon atoms.

Typical of such compounds are N,N'-di(3,5-di-isopropyl - 4 - hydroxybenzyl)ethylene diamine; N,N'-di(3,5-di - tert - butyl - 4 - hydroxybenzyl)propane diamine; N,N' - di(3,5 - di - tert - amyl - 4 - hydroxybenzyl)butane diamine; N,N' - dimethyl - N,N' - di(3,5 - di - tert - butyl-4 - hydroxybenzyl)pentane diamine; N,N' - di - propyl-N,N' - di(3,5 - di - isopropyl - 4 - hydroxybenzyl)hexane diamine; and N,N' - di - octyl - N,N' - di(3 - tert - butyl-5-methyl-4-hydroxybenzyl)decane diamine.

Exemplary aromatic compounds include N,N'-di(3,5-di-tert-butyl-4-hydroxybenzyl)p-phenylene diamine; N,N'-di(3,5 - diisopropyl - 4 - hydroxybenzyl) - N,N'-dimethyl-p-phenylene diamine; N,N'-di(3-tert-butyl-5-methyl-4-hydroxybenzyl)durene diamine; N,N'-diamyl-N,N'-di(3, 5 - di - tert - amyl - 4 - hydroxybenzyl) - 2,3,5,6 - tetra-ethyl-p-phenylene diamine; and the like.

The compounds of this invention are white or light-colored crystalline solids which are soluble in most common organic solvents and in gasolines, fuel oils, hydrocarbon oils and greases, and the like. They are characterized by rather high melting points and relatively low volatility. They are readily compatible with such materials as rubber, both natural and synthetic, polyolefins, particularly polymerized alpha-olefins, such as polyethylene, polypropylene, polybutadiene and mixtures and copolymers thereof, and with other synthetic organic polymeric substances.

Typical rubbers in which the diamino compounds of the invention may be employed include natural rubber (*Hevea brasiliensis*) and such synthetic rubberlike elastomers as SBR, polybutadiene and polyisoprene. All of these deteriorate in the presence of oxygen and ozone by hardening, cracking and checking, and thus losing their resiliency and mechanical strength. When these rubbers are processed, by milling, curing or molding, they are subjected to high temperatures which tend to volatilize some or all of the stabilizer in the rubber. However, the incorporation into the rubber of the hydroxybenzyl-thio compounds of the invention renders the resulting rubber composition resistant to oxidative deterioration during processing, since these novel stabilizers are both heat-stable and relatively non-volatile. As a consequence, the rubber compositions stabilized with these compounds have better retention of color, strength, elasticity and resistance to cracking, checking and tearing than rubber compositions containing less stable antioxidants. The diamino compounds may thus be added to the rubber at the latex stage during processing on Banbury mills or included with other substances added to the rubber during the course of manufacture. They are also sufficiently soluble in such hydrocarbons as gasoline, fuel oil, and lubricating oils and greases so that they may be incorporated in stabilizing amounts in such materials. Alternatively, they may be employed as inhibitors in such polymerizable liquid ethylenically unsaturated monomers as vinylbenzenes, including styrene, vinyltoluene and divinylbenzene; acrylates, including methyl acrylate, ethyl acrylate and 2-ethylhexyl acrylate; methacrylates, including methyl methacrylate and ethyl methacrylate; and the like, where traces of oxygen in the monomer may initiate undesirable premature polymerization.

In general, in the stabilized compositions containing the novel diamino compounds described, only an amount of any particular compound sufficient to stabilize the material against oxidative deterioration will be required. The requisite amount will, of course, depend both on the efficacy of the particular nitrogen compound and on the nature of the normally oxidizable substrate in which it is employed. It has been found that amounts of the diamino compounds from about 0.0001% by weight to about 10% by weight, based on the organic substrate, are sufficient. For example, suitable concentrations of the diamino compounds in distillate fuels, e.g., kerosene, furnace oil, are on the order of 0.0007% w. to about 0.0028% w., while in rubber somewhat larger amounts, up to about 10% w., are required.

It will be understood that, in addition to containing a stabilizing amount of the dialkyl hydroxybenzyldiamino compounds described the organic compositions of the invention may contain such other ingredients as other antioxidants, coloring agents, and the like. For example, in rubber or plastic compositions such additives as pigments, fillers, antiozonants and curing agents will be employed, while in fuel compositions such additives as anti-icing agents, dyes, antiknock and antimiss agents and similar conventional ingredients will be found. Lubricants will contain gelling agents, extreme pressure additives and such other materials as are employed in commercial formulations. These additives will not interfere with the superior stabilizing effect of the diamino compounds of the invention.

The diamines of the invention are prepared by reacting 3,5-dialkyl-4-hydroxybenzyl halide, such as 3,5-dialkyl-4-hydroxybenzyl chloride, with the appropriate diamine under anhydrous conditions, preferably in an inert hydrocarbon solvent, and recovering the poly(dialkyl-hydroxybenzyl)diamine. The reaction may be conducted at or above room temperature, preferably from −20° C. to about 100° C.

Suitable reactants are 3,5-dialkyl-4-hydroxybenzyl halides having the structure

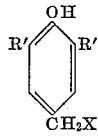

wherein each R' is an alkyl radical and X is a halide ion such as chloride, iodide, or bromide. Preferred R"'s are those alkyl radicals having up to 8 carbon atoms, and the most useful diamines are those prepared from halides wherein at least one of the R"'s is branched on the alpha carbon atom. Most preferred halides are those wherein both R"'s are tertiary. Typical starting compounds are 3-methyl-5-isopropyl-4-hydroxybenzyl chloride; 3-ethyl-5-tert-butyl-4-hydroxybenzyl bromide; 3,5-diisopropyl-4-hydroxybenzyl chloride and 3-isopropyl-5-tert-octyl-4-hydroxybenzyl chloride. Exemplary of the most preferred reactants are 3,5-di-tert-butyl-4-hydroxybenzyl chloride and 3,5-di-tert-amyl-4-hydroxybenzyl chloride.

Such halides are reacted with either primary or secondary organic diamines having the formula

NHR"—R—NHR"

where R" may be the hydrogen atom or an alkyl group and R is alkylene or divalent aromatic as noted above. Exemplary aliphatic diamines are methylene diamine; ethylene diamine; trimethylene diamine; tetramethylene diamine, hexamethylene diamine; 1,10-diaminodecane; N,N'-dimethyl trimethylene diamine; and N,N'-dioctyl hexamethylene diamine. Representative aromatic diamines include p-phenylene diamine; durene diamine; m-phenylene diamine; o-phenylene diamine; 2,3,5,6-tetraethyl-p-phenylene diamine; N,N'-dihexyl-p-phenylene diamine; and N,N'-dioctyl durene diamine.

The 3,5-dialkyl-4-hydroxybenzyl halide and the organic diamine are reacted together under anhydrous conditions, preferably in an inert solvent such as a hydrocarbon, such as benzene, toluene or xylene, or an alcohol, such as ethanol or methanol. Pyridine may also be employed as a solvent or in the reaction medium as a halide acceptor. The proportions of the reagents are dictated by the product desired, amounts of reactants, on the order of from about two to about four moles of the amine per mole of halide being convenient. The use of slight excesses of the amine reactant over stoichiometric are preferred. The product is readily separated from the reaction mixture by such conventional methods as extraction, distillation, crystallization or the like.

The novel compounds may also be prepared by reacting the 3,5-dialkyl-4-hydroxybenzaldehyde with the diamine to form the diimine and hydrogenating the diimine to the desired diamine.

The following examples will illustrate the procedures by which the novel compounds and compositions of the invention may be prepared. It should be understood, however, that these examples are merely illustrative and not to be regarded as limitations to the appended claims, since the basic teachings thereof may be varied at will as will be understood by one skilled in the art. In the examples the proportions are expressed in parts by weight unless otherwise noted.

EXAMPLE I

A solution of 0.1 mole of 3,5-di-tert-butyl-4-hydroxybenzyl chloride in 60 ml. of n-hexane was diluted with 100 ml. of benzene, and to it was added 7.4 grams (0.1 mole) of trimethylene diamine. The heat of reaction caused some boiling of the solvent, and the amine hydrochloride precipitated at once. The mixture was allowed to stand overnight, and then filtered to remove the precipitated product.

Solid hydrochloride was filtered, and the filtrate was concentrated and a total of 19.5 grams of solid was crystallized. This was washed with benzene and recrystallized from ethanol to yield a total of 17.3 grams (73%) of N,N,N',N'-tetra(3,5-di-tert-butyl-4-hydroxybenzyl)-1,3-diaminopropane. The product had a melting point of 189° C. and the following analysis:

|  | C | H | N | M.W. |
|---|---|---|---|---|
| Calculated for $C_{63}H_{100}O_4N_2$ | 79.69 | 10.62 | 2.95 | 949.4 |
| Found | 79.7 | 10.4 | 2.99 | 920 |

EXAMPLE II

Employing the same techniques as in Example I but starting with p-phenylene diamine, the N,N,N',N'-tetra (3,5-di-tert-butyl-4 - hydroxybenzyl)p-phenylene diamine is obtained in good yield.

EXAMPLE III

Employing the method of Example I, 3,5-di-tert-butyl-4-hydroxybenzyl chloride was reacted with ethylene diamine. The product, obtained in high yield, was a crystalline solid whose elemental analysis corresponded to that predicted for N,N,N',N'-tetra(3,5-di-tert-butyl - 4 - hydroxybenzyl)-1,2-diaminoethane.

EXAMPLE IV

When 3,5-diisopropyl-4-hydroxybenzyl chloride is reacted with N,N'-dimethyltetramethylene diamine by the method of Example I, the product is N,N'-dimethyl-N,N'-di(3,5-diisopropyl-4-hydroxybenzyl) - 1,4 - diaminobutane.

EXAMPLE V

The diamine prepared in Example I was evaluated as an antioxidant in polypropylene. Polypropylene film samples each containing 0.5% by weight of the diamine were tested by heat aging, outdoor exposure and fadeometer. Resulting data are presented in Table I.

In the heat aging test, polypropylene film samples five mils in thickness are maintained in an oven at 133° C. Each sample was tested for loss of elongation three times a day until the film tore easily. The number of days shown on the table are the total elapsed days before film tested lost its tensile strength and flexibility. It will be seen from the table that the diamine increased the heat stability of the polypropylene by a factor of about 9.

In the outdoor exposure test, five mil film samples of polypropylene were exposed on the laboratory roof at Emeryville, California, and periodically tested by bending through 180°. The number of weeks required before the films so tested snapped on bending is shown in the table. It will be seen that the esters increased the weather stability of the polypropylene by a factor of about 8.

In the accelerated Fadeometer test, the conventional Atlas Weatherometer wherein the arc light source has been supplemented by addition of eight fluorescent ultraviolet light sources, all film samples tested pass within a quarter inch of the light sources. It has been found that in this accelerated exposure test, conditions are approximately eight times as stringent as in the unmodified Weatherometer. It will be seen from the table that under these extreme conditions use of the diamine of the invention substantially increases the ultraviolet light stability of the polypropylene.

*Table I*

| Additive | Oven, Days | Fadeometer, Days | Outdoor, Weeks |
|---|---|---|---|
| None | <0.5 | 0.5 | 0.4 |
| N,N,N',N'-tetra(3-5-di-tert-butyl-4-hydroxybenzyl)-1,3-diaminopropane | 4.5 | 4 | 4 |

EXAMPLE VI

When samples of polyisoprene rubber, each containing 1.5 parts of stabilizer per 100 parts of rubber, are prepared with N,N,N',N'-tetra(3,5 - di - tert - butyl-4-hydroxybenzyl)-1,3-diaminopropane and with N,N,N',N'-tetra(3,5 - di - tert-butyl-4-hydroxybenzyl)-p-phenylene diamine, the resulting compositions have far better tensile strength retention, better resistance to checking and cracking, and better elasticity than an unstabilized sample of the same rubber.

Evaluation of these samples is conducted by exposing each sample for 72 and 168 hours in an oxygen bomb pressured to 300 p.s.i.g. at 70° C. and determining the physical properties of each of the samples at the end of each of these periods.

EXAMPLE VII

A number of antioxidants were tested by a variation of the Olcott oxygen absorption test; see Olcott et al., J. Am. Oil Chemists' Soc. 35, 161 (1958). In the test, one gram samples of safflower oil containing 0.0002 gram of antioxidant were stored in an oven at 50° C. and weighed periodically until a rapid increase in weight, corresponding to the development of rancidity, was obtained. The data showing the relative effectiveness of the antioxidants in the oil are presented in Table II.

*Table II*

| Antioxidant (0.02% w.): | Days to rancidity (50° C.) |
|---|---|
| None | 5¾ |
| Bis(3,5-di - tert - butyl-4-hydroxyphenyl)methane | 7¼ |
| N,N-(3,5-di-tert-butyl-4-hydroxybenzyl)aniline | 8½ |
| N,N,N',N'-tetra(3,5-di-tert-butyl-4-hydroxybenzyl)-1,3-propanediamine | 9 |

EXAMPLE VIII

The compounds of the invention were evaluated for their ability to catalyze air inhibitor sweetening of gasoline. The gasoline employed was a commercial light catalytically cracked motor gasoline which contained no additives and had not been sweetened. The mercaptan content of the gasoline was brought to 0.0090 with n-butyl mercaptan, and the candidate compounds were added to samples of the resulting gasoline at a concentration of 2 mg./dl.

In the test, samples containing N,N,N',N'-tetra(3,5-di-tert-butyl-4-hydroxybenzyl)trimethylene diamine were allowed to sit at room temperature in bottles containing a notched cork, such that air was freely admitted to each sample. The mercaptan content of the gasoline was determined by periodic electrometric titrations with silver nitrate.

The resulting data are presented as Table III below.

*Table III*

| Days: | Sulfur, percent by weight, as RSH |
|---|---|
| 0 | 0.0090 |
| 2 | 0.0078 |
| 4 | 0.0063 |
| 8 | 0.0032 |

We claim as our invention:

1. The stabilized composition consisting essentially of a polymer selected from the group consisting of hydrocarbon rubbers and polymerized hydrocarbon alpha-olefins, containing an amount, sufficient to stabilize the polymer against oxidative deterioration, of a poly(3,5-dialkyl-4-hydroxybenzyl)hydrocarbon diamine, selected from the group consisting of alkane diamine and mononuclear aromatic diamine, wherein said alkane and mononuclear aromatic moieties have up to 12 carbon atoms each, and each alkyl group on said benzyl nuclei has up to 8 carbon atoms.

2. The stabilized composition consisting essentially of hydrocarbon rubber and containing an amount, sufficient to stabilize said rubber against oxidative deterioration, of the N,N,N',N'-tetra(3,5-dialkyl-4-hydroxybenzyl)hydrocarbon diamine, selected from the group consisting of alkane diamine and mononuclear aromatic diamine, wherein said alkane and mononuclear aromatic moieties have up to 12 carbon atoms each and each alkyl group on said benzyl nuclei has up to 8 carbon atoms.

3. The poly nitrogen-substituted (3,5-dialkyl-4-hydroxylbenzyl)hydrocarbon diamine having at least one 3,5-dialkyl-4-hydroxybenzyl radical attached to each of the amine nitrogen atoms, wherein the hydrocarbon diamine is selected from the group consisting of alkane diamines and mononuclear aromatic diamines of up to 12 carbon atoms each and wherein each alkyl radical has up to 8 carbon atoms.

4. The N,N,N',N' - tetra(3,5-dialkyl-4-hydroxybenzyl)

hydrocarbon diamine selected from the group consisting of alkane diamine and mononuclear aromatic diamine, wherein the alkane and mononuclear aromatic moieties have up to 12 carbon atoms each and each alkyl radical has up to 8 carbon atoms.

5. The N,N'-di(3,5-dialkyl-4-hydroxybenzyl)hydrocarbon diamine selected from the group consisting of alkane diamine and mononuclear aromatic diamine, wherein the alkane and mononuclear aromatic moieties have up to 12 carbon atoms each and each alkyl group has up to 8 carbon atoms.

6. N,N,N',N'-tetra(3,5 - dialkyl - 4 - hydroxybenzyl)alkane diamine, said alkane group having up to twelve carbon atoms, each of the alkyl groups on said benzyl nuclei having up to 8 carbon atoms and at least one of the alkyl groups on said benzyl nuclei being branched on the alpha carbon atom.

7. N,N,N',N' - tetra(3,5-dialkyl-4-hydroxybenzyl)aromatic diamine, said aromatic group being mononuclear of up to 12 carbon atoms, each of the alkyl groups on said benzyl nuclei having up to 8 carbon atoms, and at least one of the alkyl groups on said benzyl nuclei being branched on the alpha carbon atom.

8. N,N,N',N'-tetra(3,5 - di-tert-butyl-4-hydroxybenzyl) 1,3-diaminopropane.

9. N,N,N',N' - tetra(3,5-di-tert-butyl-4-hydroxybenzyl) phenylene diamine.

References Cited in the file of this patent
UNITED STATES PATENTS

| | | |
|---|---|---|
| 2,129,135 | Jones | Sept. 6, 1938 |
| 2,957,908 | Wiley et al. | Oct. 25, 1960 |
| 2,962,531 | Coffield | Nov. 29, 1960 |